United States Patent [19]

Barbour

[11] Patent Number: 5,042,128

[45] Date of Patent: Aug. 27, 1991

[54] TOOL FOR REMOVING VALVE SPRING RETAINER OF A VALVE ASSEMBLY

[76] Inventor: Charles A. Barbour, P.O. Box 443, Stedman, N.C. 28391

[21] Appl. No.: 620,848

[22] Filed: Dec. 3, 1990

[51] Int. Cl.[5] .......... B23P 19/04

[52] U.S. Cl. .......... 29/217

[58] Field of Search .......... 29/215-221

[56] References Cited

U.S. PATENT DOCUMENTS 3,080,645 3/1963 Moreland .......... 29/218

4,567,634 2/1986 Landry .......... 29/220

FOREIGN PATENT DOCUMENTS 860635 10/1939 France .......... 29/217

*Primary Examiner*—Robert C. Watson

*Attorney, Agent, or Firm*—Rhodes, Coats & Bennett

[57] ABSTRACT

The present invention entails a hand tool for use in removing a valve spring retainer forming a part of a conventional valve assembly of an internal combustion engine. The tool includes a lever secured to a threaded bolt and pivotally mounted to that same bolt. A seat is formed on the bottom of the bolt and functions to seat within a push rod bore of an internal combustion engine. An end portion of the lever is adapted to rest atop the spring of the valve assembly. Finally, an intermediate opening is formed in the lever for receiving a threaded bolt that extends up from the internal combustion engine between the valve assembly and the push rod bore. A nut is threaded downwardly on the bolt that extends through the intermediate opening within the lever and consequently restricts the vertical movement of the intermediate section of the lever. By selectively turning the elongated rod that seats within the push rod bore, the end of the lever that is connected to the bolt is caused to move upwardly. Because the vertical movement of the intermediate section of the lever is restricted, the end section of the lever that is engaged with the valve spring is caused to move downwardly, depressing the valve spring and separating it from the valve spring retainer thereby facilitating the removal of the valve spring retainer.

6 Claims, 3 Drawing Sheets

TOOL FOR REMOVING VALVE SPRING RETAINER OF A VALVE ASSEMBLY

FIELD OF THE INVENTION

The present invention relates to tools and more particularly to hand tools of the type utilized to dismantle valve assemblies of an internal combustion engine.

BACKGROUND OF THE INVENTION

When rebuilding an internal combustion engine or otherwise repairing the valve assembly, it is necessary to remove the valve assembly from the internal combustion engine. One problem that continues to plague mechanics time after time on virtually all internal combustion engines, is the problem of removing the valve spring retainer that is secured to the valve stem or the valve rod just above the valve spring. As those familiary with internal combustion engines and skilled in the art will appreciate, the valve assembly is designed such that the valve spring when not compressed by the rocker arm, exerts substantial pressure and force against the valve spring retainer causing the valve itself to be held in a closed position. It is this substantial spring force and the overall nature of the design of a valve assembly that makes it difficult for the mechanic to remove the valve retainer without requiring an additional person or some type of tool specially made to depress the valve spring and to hold the valve spring in a depressed position such that the valve spring retainer can be removed form the valve stem or rod.

This problem has been appreciated in the past and there have been attempts at providing a tool to be used in removing valve spring retainers. For example, it is known to use a simple hand actuated prying member to separate the valve spring from the valve spring retainer. In this case, the mechanic has to hold the prying member in one hand and insert the same between the valve spring retainer and the valve spring and to push down on the prying member so as to depress the valve spring and to create a free space between the valve spring and the valve retainer such that the valve spring retainer can be easily removed. But one main drawback to this pyring member device was that it requires the use of at least one of the mechanic's hands during the process, tending to hinder the mechanic's ability to remove and free the valve spring retainer from the valve stem or rod. In addition, with this prying type member it was difficult to firmly engage the spring and maintain the prying member on the spring, without it slipping off, during the spring depression operation.

Therefore, there has been and continues to be a need for a simple and easy to use tool for depressing the valve spring of a valve assembly such that the valve spring retainer can be easily removed.

SUMMARY AND OBJECTS OF THE INVENTION

The present invention presents a tool that is designed to facilitate the removal of a valve spring retainer which overcomes many of the disadvantages and drawbacks of prior art devices. The tool of the present invention is designed to work in conjunction with the internal combustion engine to depress the valve spring in such a manner that once the valve spring is depressed both hands of the mechanic are free to move the valve spring retainer while the tool itself maintains the valve spring in a depressed condition. In particular, the tool of the present invention includes an elongated threaded bolt that seats within the push rod bore and which has attached thereto a lever that extends over a rocker arm support bolt and engages the top portion of a valve spring. By selectively turning the elongated bolt, the end of the lever attached thereto raises. As the end portion of the lever is raised, the rocker arm support bolt and nut (sometimes herein referred to as an intermediate bolt and nut) restricts the vertical movement of the intermediate section of the lever. This results in the extreme end or remote end of the lever which engages the valve spring being pushed downwardly causing the valve spring to be depressed and separated from the valve spring retainer. This clearly creates a space between the valve spring retainer and the valve spring and because of the nature of the tool, this separation is maintained purely by the tool itself without any aid from the mechanic. This enables the mechanic to use both hands and a full compliment of tools, if required, to remove the valve spring retainer.

It is therefore an object of the present invention to provide a tool for removing a valve spring retainer of a valve assembly that is simple and easy to use.

Another object of the present invention is to provide a tool of the character referred to above that will maintain a valve spring in a depressed condition without any aid or assistance from the mechanical thereby leaving both hands of the mechanic free to remove the valve spring retainer.

Another object of the present invention resides in the provision of a special tool for removing valve spring retainers that utilizes a bolt type actuator that can be turned and which continuously applies force through a lever to the valve spring, depressing the same in the process.

Still a further object of the present invention resides in the provision of a tool of the basic character referred to above that is designed to work in conjunction with the basic structure of an internal combustion engine, inasmuch as the tool is designed to be secured in an operative and usable manner by being disposed about the internal combustion engine itself.

Other objects and advantages of the present invention will become apparent and obvious from a study of the following description and the accompanying drawing which are merely illustrative of such invention.

DETAILED DESCRIPTION OF THE INVENTION

Figure 1:
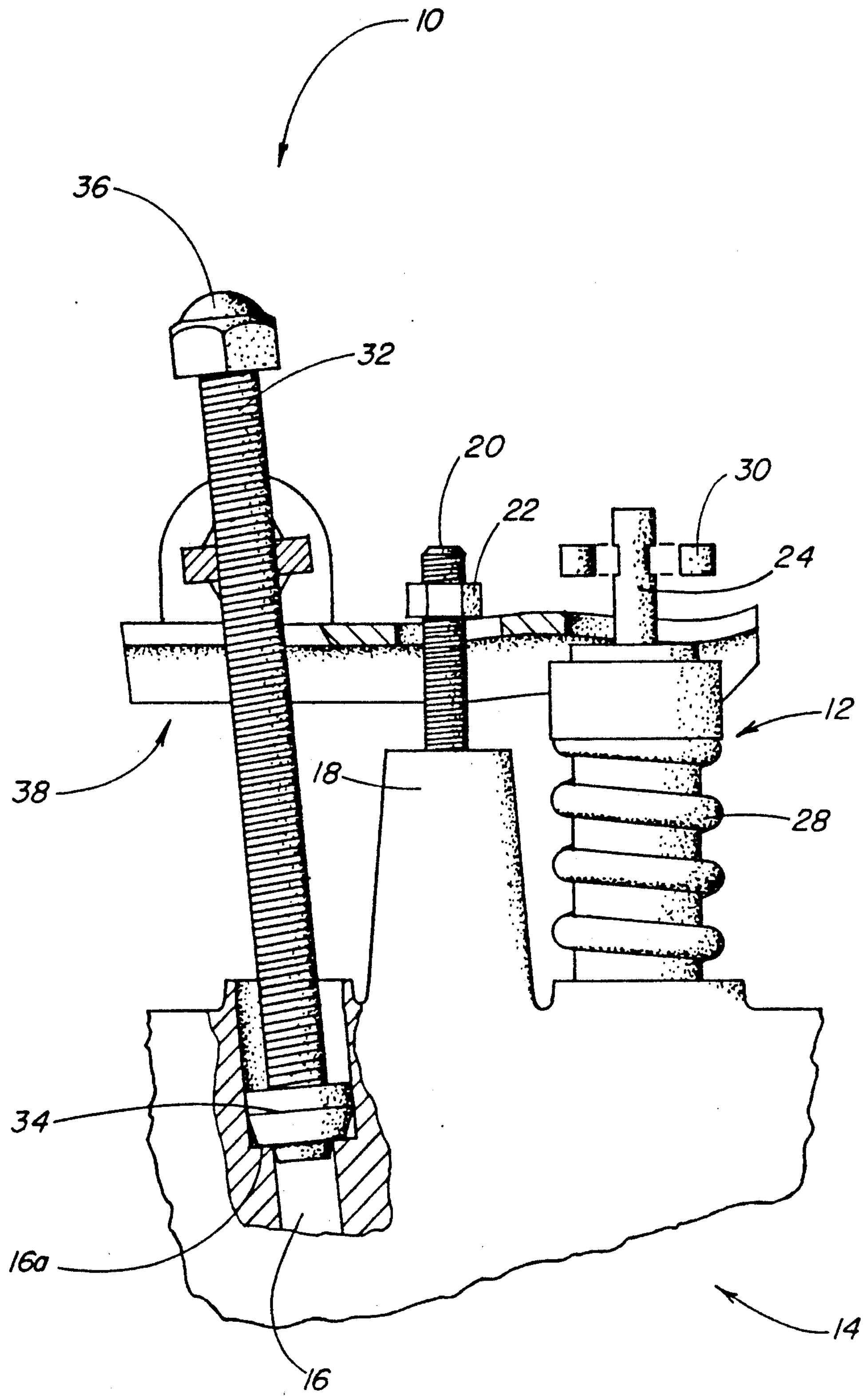
FIG. 1 is a side elevational view of the tool of the present invention, shown in partial section, being used on an internal combustion engine to separate a valve spring from a valve spring retainer.
Figure 2:
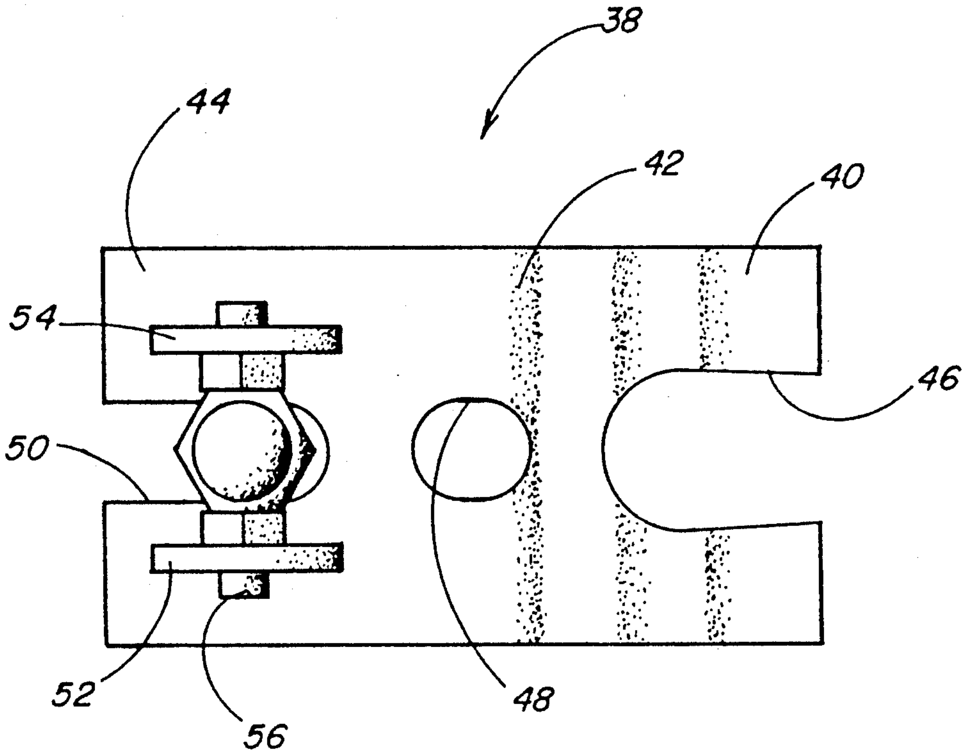
FIG. 2 is a top plan view of the tool of the present invention.
Figure 3:
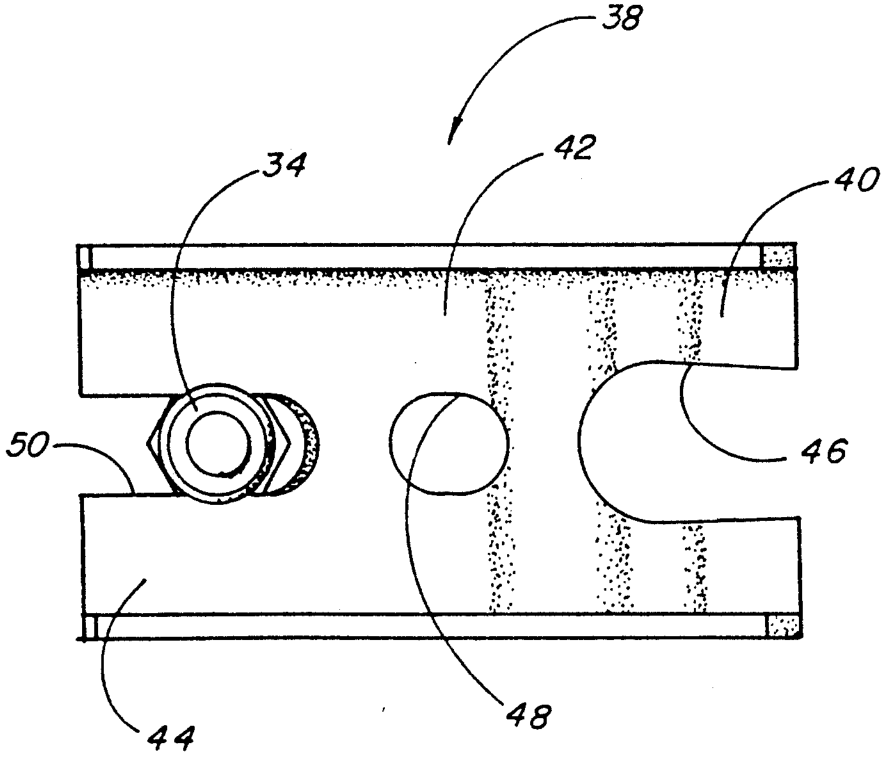
FIG. 3 is a bottom plan view of the tool.
Figure 4:
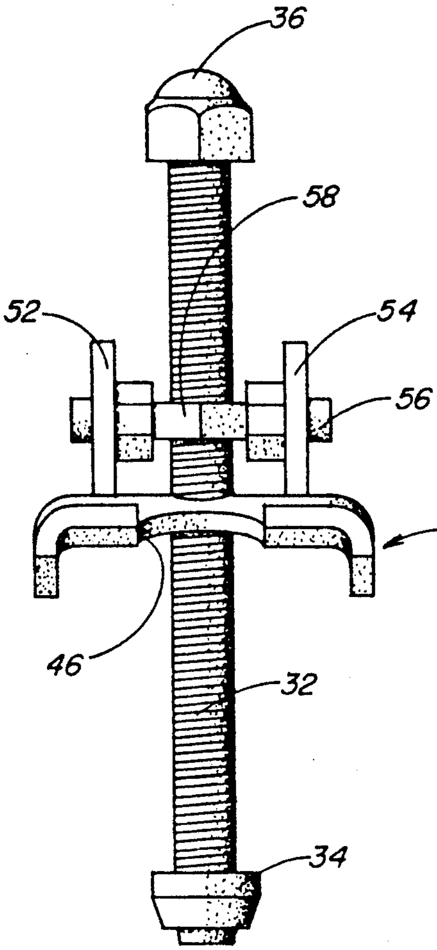
FIG. 4 is a front elevational view of the tool of the present invention.
Figure 5:
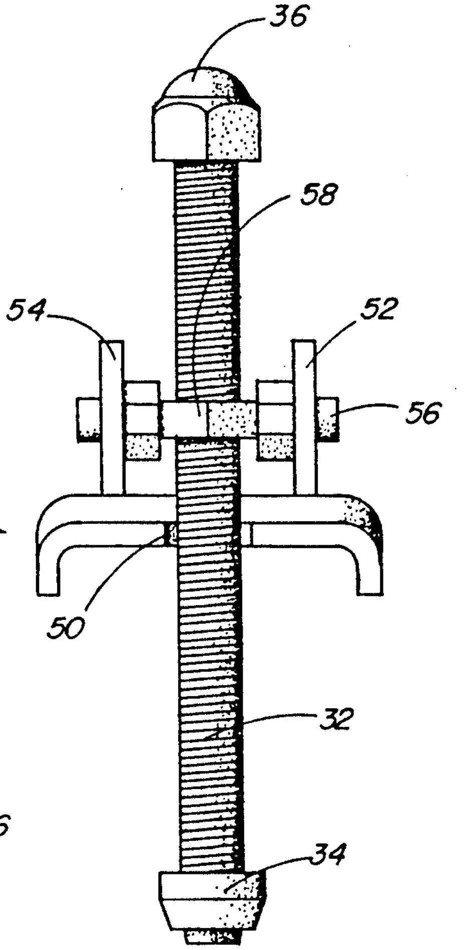
FIG. 5 is a rear elevational view of the tool of the present invention.
Figure 6:
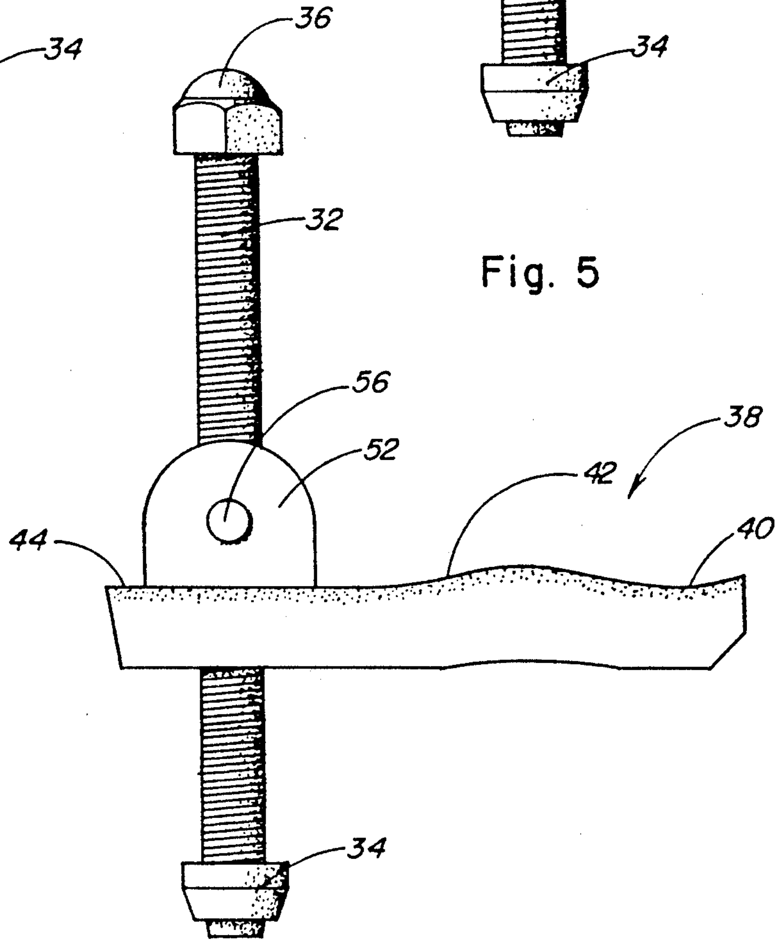
FIG. 6 is a side elevational view of the tool of the present invention.

With further reference to the drawings, the tool of the present invention is shown therein and indicated generally by the numeral 10. As seen in FIG. 1, tool 10 is designed to engage a valve assembly 12 that forms a part of an internal combustion engine 14 and as will be appreciated from subsequent portions of this disclosure the tool 10 is designed to depress the valve assembly 12 and particularly the valve spring 14 so as to separate the valve spring 14 form a conventional valve spring retainer or clip 30 that also forms a the part of the valve spring. But as just referred to, the valve assembly 12 forms a part of an internal combustion engine that is conventional in design and nature. For the sake of understanding the tool 10 of the present invention and how it is used, it should be pointed out that the internal combustion engine is provided with a push rod bore 16 which is disposed within the internal combustion engine 14 opposite the valve assembly 12. As seen in FIG. 1, the push rod bore 16 includes a step down in diameter near the top of the push rod bore and in this case the step down in diameter is referred to as a shoulder 16*a*. Also, with respect to the internal combustion engine 14, it is seen that there is a raised shoulder 18 that extends longitudinally between each valve assembly 12 and the push rod bore 16. Secured to the raised shoulder 18 is a rocker arm post 20 or sometimes referred to as a retainer or intermediate bolt 20 which is adapted to receive a nut 22. Typically, this retainer bolt or rocker arm post 20 functions to support and hold the rocker arm that is connected to a push rod which in turn engages and continuously presses downwardly and releases the valve spring assembly 12 during the operation of the internal combustion engine.

Turning now to the valve spring assembly 12, it is seen that the same includes an elongated valve stem or rod 24 that extends from the internal combustion engine in conventional fashion. A valve spring 28 rests between the upper surface of the internal combustion engine and a valve spring retainer or clip 30 that is secured to the upper end of the valve stem 24. The valve spring 28 is biased to extend the valve stem upwardly as viewed in FIG. 1 to a closed position. In conventional and known fashion, the valve spring 28 exerts substantil force on the valve spring retainer 30 (which in FIG. 1 is shown suspended from the valve stem 24) when the vale is in the closed position. It is appreciated that in the operation of the internal combustion engine 14 that the respective rocker arms repeatedly depress the vale spring 28 thereby opening the valve and once the force from the rocker arm is released, the valve spring 28 acts to force the valve closed by engaging the valve spring retainer.

Again, the present invention deals with removing the valve spring retainer and particularly providing a tool that will depress the valve spring 28 and separate the same from the valve spring retainer 30 such that the retainer can be removed.

Now turning to the tool of the present invention, it is seen that the tool comprises an elongated threaded bolt 32 having a lower seat 34 and a turning head 36. Seat 34 is designed to rest on the shoulder or step 16*a* of the push rod bore and in particular, the elongated threaded bolt 32 is designed to be received and accepted by the puch rod bore such that it may extend upright thereform and be supported by the structure of the internal combustion engine 14 itself.

Pivotally connected to the elongated threaded bolt 32 is a valve spring depression lever indicated generally by the numeral 38. In particular, the lever 38 is secured to the elongated threaded bolt such that as the bolt is turned, the lever 38 moves up and down with respect to the bolt depending on the direction the bolt is turned.

Viewing lever 38 in more detail, it is seen that the same includes an end section 40 that is referred to as spring engaging section also. Also, the lever 38 incldues an intermediate section 42. Finally, the other end section of the lever is referred to as the lifting or raising end section and that section is referred to by the numeral 44.

Formed in the spring engaging section 40 is a u-shaped cutout 46 that is designed to fit atop and around the upper end of valve spring 28. Formed intermediately on the lever 38 is an opening 48 that is adapted to receive and work in conjunction with the rocker arm post 20 described above. Finally, about the lifting end section 44 of the lever 38 is another u-shaped cutout 50 which accommodates the elongated threaded bolt 32 and allows the bolt to swing back and forth through the u-shaped cutout.

Turning back to the securement of the lever 38 to the elongated threaded bolt 32, it is seen that there is provided a pair of arms 52 and 54 which extend upwardly from the lever 38 about the sides of the u-shaped cutout 50. Pivotally interconnected between the arms 52 and 54 is a pivot or rock shaft 56. The pivot or rock shaft 56 includes a central nut 58 that is threaded onto the elongated threaded bolt 32. Thus, it is appreciated that as the elongated threaded bolt 32 is turned in a selected direction, that the lifting portion or section 44 of the lever 38 can be caused to move upwardly with respect to the elongated threaded bolt 32 and at the same time the lever 38 can pivot with respect to the same elongated threaded bolt 32.

In use, the tool 10 is positioned on an internal combustion engine 14 as illustrated in FIG. 1. Note that the seat 34 of the elongated threaded bolt 32 is seated in the push rod bore 16. Also note that the intermediate opening 48 of the lever 38 has been positioned such that the rocker arm post 20 extends upwardly therethrough and a nut 22 is secured atop the lever 38 such that the intermediate section 44 of the lever 38 cannot raise or lift above the nut 22. Positioned atop the valve spring 28 is the u-shaped cutout 46 formed in the valve spring engaging end 40 of the lever 38. By selectively turning head 36, the nut 58 forming a part of the pivot shaft 56 rides up the elongated threaded bolt 32. As nut 58 rides up the elongated threaded bolt 32 the left most section as viewed in FIG. 1 or the lifting section of the lever 38 moves upward. Because of the limitation placed on the lever 38 by the nut 22 secured to the rocker arm bolt or retained bolt 20, the upward movement of the lifting section 44 of the lever 38 results in the opposite end portion or that portion referred to by numeral 40, being pressed downwardly. This downward pressing action as illustrated in FIG. 1, causes the valve spring 28 to be depressed which in turn creates a free space between the valve spring 28 and the valve spring retainer 30 which is shown in FIG. 1 as being separated from the valve stem 24. It is appreciated that after the valve spring 30 has been removed from the valve stem 24 that the tool can be removed by simply turning the elongated threaded bolt 32 in the opposite direction so as to relieve the force from the valve spring 28 such that the valve spring 28 can return to its normal position. Once this has been achieved, the entire valve assembly can be disassembled rather easily.

From the foregoing specification and discussion, it is appreciated that the tool of the present invention greatly facilitates the dismantling of a valve assembly of an internal combustion engine. In particular, the tool is designed to fit with and work in conjunction with an internal combustion engine so as to depress a valve spring 28 such that a valve spring retainer 30 can be easily and conveniently removed. One important aspect of the present invention is the fact that this can be achieved while freeing both hands of the mechanic to work on the valve spring retainer. In addition, the tool of the present invention is simple and easy to use as well as durable.

The present invention may, of course, carried out in other specific ways that those herein set forth without parting form the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tool for facilitating the removal of a valve spring retainer forming a part of a valve assembly having a valve stem and a valve spring for biasing the valve assembly towards a closed position wherein the valve assembly forms a part of an internal combustion engine having a push rod bore and an intermediate bolt and nut disposed between the push rod bore and the valve assembly, the tool comprising:

(a) an elongated driving bolt having a lower end;

(b) a seat formed on the lower end of the elongated bolt for seating within the push rod bore and supporting the elongated bolt in an upright erect position;

(c) a lever pivotally mounted to the elongated bolt and extending therefrom and including a valve spring engaging section for engaging the top of the valve spring disposed beneath the valve spring retainer, an intermediate section, and a pivoting section which is pivotally connected to the elongated bolt;

(d) the lever including an intermediate opening for receiving the intermediate bolt disposed between the push rod bore and the valve assembly and wherein vertical movement of the intermediate section of the lever can be restricted by threading the nut downwardly on the intermediate bolt where the nut engages the top of the lever about the intermediate section thereof; and (e) wherein the valve spring may be depressed, enabling the valve spring retainer to be removed from the valve stem by selectively rotating the elongated driving bolt causing the pivot end of the lever to move vertically while the intermediate bolt and nut limits the vertical movement of the intermediate section of the lever which results in the spring engaging section of the lever moving downwardly and pushing the valve spring downwardly away from the valve spring retainer such that the valve spring retainer can be conveniently removed.

2. The tool of claim 1 wherein the valve spring engaging section includes a generally u-shaped cutout for fitting over the valve spring of the valve assembly.

3. The tool of claim 3 wherein the pivoting section of the lever includes a u-shaped cutout for extending around the elongated driving bolt, and wherein there is a pair of arms secured to the pivoting section of the lever and extending upwardly on each side of the u-shaped cutout formed in the pivoting section, a pivot shaft pivotally interconnected between the arms, and a threaded nut secured to the pivot shaft and threaded on the elongated bolt.

4. A tool for depressing the valve spring of a valve assembly so as to facilitate the removal of a valve spring retainer forming a part of the valve assembly, comprising:

(a) an elongated threaded bolt having a lower end with a seat thereon for seating into the push rod bore of an internal combustion engine;

(b) a lever having a bolt end section connected to the elongated bolt and wherein the bolt end section of the lever is movable up and down on the elongated bolt in response to the bolt being selectively turned;

(c) the lever further including a valve spring engaging end section for engaging the valve spring of the valve assembly and the lever further including an intermediate section disposed between the valve spring engaging end section and the bolt end section; and (d) means for inhibiting the vertical movement of the lever's intermediate section in response to the bolt raising the bolt end section vertically such that the valve spring engaging section of the lever is forced downwardly depressing the valve spring and facilitating the removal of the valve spring retainer, wherein the means for inhibiting the vertical movement of the lever's intermediate section includes an opening formed in the intermediate section wherein the opening is adapted to receive a threaded holding bolt having a retainer nut thereon that engages the top of the lever's intermediate section so as to prohibit the intermediate section from rising vertically in response to the bolt end section of the lever moving vertical.

5. The tool of claim 4 wherein the valve spring engaging section of the lever includes a generally u-shaped cutout for fitting over the valve spring of the valve assembly.

6. The tool of claim 4 wherein the bolt end section of the lever includes a generally u-shaped cutout for receiving the elongated threaded bolt and wherein the bolt end section of the lever is pivotally connected to the elongated threaded bolt via a nut threaded on the elongated threaded bolt, thereby permitting the bolt end section of the lever to pivot back and forth through the u-shaped cutout formed in the bolt end section.

* * * * *